(12) United States Patent
Dudar et al.

(10) Patent No.: US 12,325,298 B2
(45) Date of Patent: Jun. 10, 2025

(54) METHODS AND SYSTEMS FOR FUEL SYSTEM

(71) Applicant: Ford Global Technologies, LLC, Dearborn, MI (US)

(72) Inventors: Aed Dudar, Canton, MI (US); Scott Alan Bohr, Novi, MI (US); Chuck Frank Bartus, Grosse Ile, MI (US); Frank Joseph Topolovec, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/478,022

(22) Filed: Sep. 29, 2023

(65) Prior Publication Data

US 2025/0108685 A1 Apr. 3, 2025

(51) Int. Cl.
*B60K 15/035* (2006.01)

(52) U.S. Cl.
CPC ............ *B60K 15/03519* (2013.01); *B60K 2015/03561* (2013.01); *B60K 2015/0358* (2013.01)

(58) Field of Classification Search
CPC .... B60K 15/03519; B60K 2015/03561; B60K 2015/0358
See application file for complete search history.

(56) References Cited

U.S. PATENT DOCUMENTS

| | | | |
|---|---|---|---|
| 6,478,849 B1 * | 11/2002 | Taylor | F02M 25/089 96/111 |
| 11,104,222 B2 * | 8/2021 | Dudar | B60K 15/03504 |
| 11,333,095 B1 * | 5/2022 | Dudar | F02M 25/0836 |
| 11,493,001 B1 | 11/2022 | Dudar et al. | |
| 11,585,298 B1 | 2/2023 | Dudar et al. | |
| 2003/0127134 A1 | 7/2003 | Mills | |
| 2017/0130659 A1 * | 5/2017 | Dudar | F02M 25/0836 |
| 2020/0189385 A1 * | 6/2020 | Dudar | B60K 15/03504 |

* cited by examiner

*Primary Examiner* — Patrick C Williams
(74) *Attorney, Agent, or Firm* — Vincent Mastrogiacomo; McCoy Russell LLP (57) ABSTRACT

Methods and systems are provided for a fuel system. In one example, a fuel system includes a plurality of canisters with a fuel tank isolation valve (FTIV) configured to control a fluid coupling between each of the plurality of canisters and a fuel tank. The FTIV is actuated based on one or more of a fuel tank pressure and a load of each of the plurality of canisters.

20 Claims, 7 Drawing Sheets

METHODS AND SYSTEMS FOR FUEL SYSTEM

FIELD

The present description relates generally to methods and systems for a fuel system comprising multiple vapor canisters

BACKGROUND/SUMMARY

Vehicle emission control systems may be configured to store vapors from a fuel tank refueling and diurnal engine operations in a vapor canister. This configuration is known as onboard fuel recovery and includes the canister(s) being sized to adsorb vapors during refueling, running loss, hot soak, and vehicle off. The stored vapors may be purged during a later engine operating condition. The stored vapors may be routed to an engine intake for combustion, which may affect fuel economy.

Heavy duty vehicles may include offboard recovery vehicle emission control systems. Offboard recovery systems may not capture vapors during refueling, which may allow canisters thereof to be sized smaller than an onboard configuration. However, to reduce emissions, heavy duty vehicle may include onboard recovery vehicle emission control systems.

Heavy duty vehicles may include relatively large fuel tanks compared to passenger vehicles. A single large canister in a heavy duty vehicle may present restrictions during refueling, which may lead to premature refueling pump shut-off. Thus, a series canister arrangement may only work up to a determined fuel tank size. Parallel canister arrangements in heavy duty vehicles may be prone to releasing vapors during long vehicle shut-off events with high diurnal temperatures due to vapors passing through a more loaded of the canisters. Thus, a canister sizing and arrangement for onboard vapor recovery in heavy duty vehicles is desired In one example, the issues described above may be addressed by a fuel system including a fuel tank, a first canister, a second canister, a third canister, and a first fuel tank isolation valve (FTIV) configured to fluidly couple the fuel tank to a first canister vent line, a second canister vent line, and a third canister vent line. In this way, a system complexity may be reduced while decreasing depressurization times and inadvertent emissions to atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
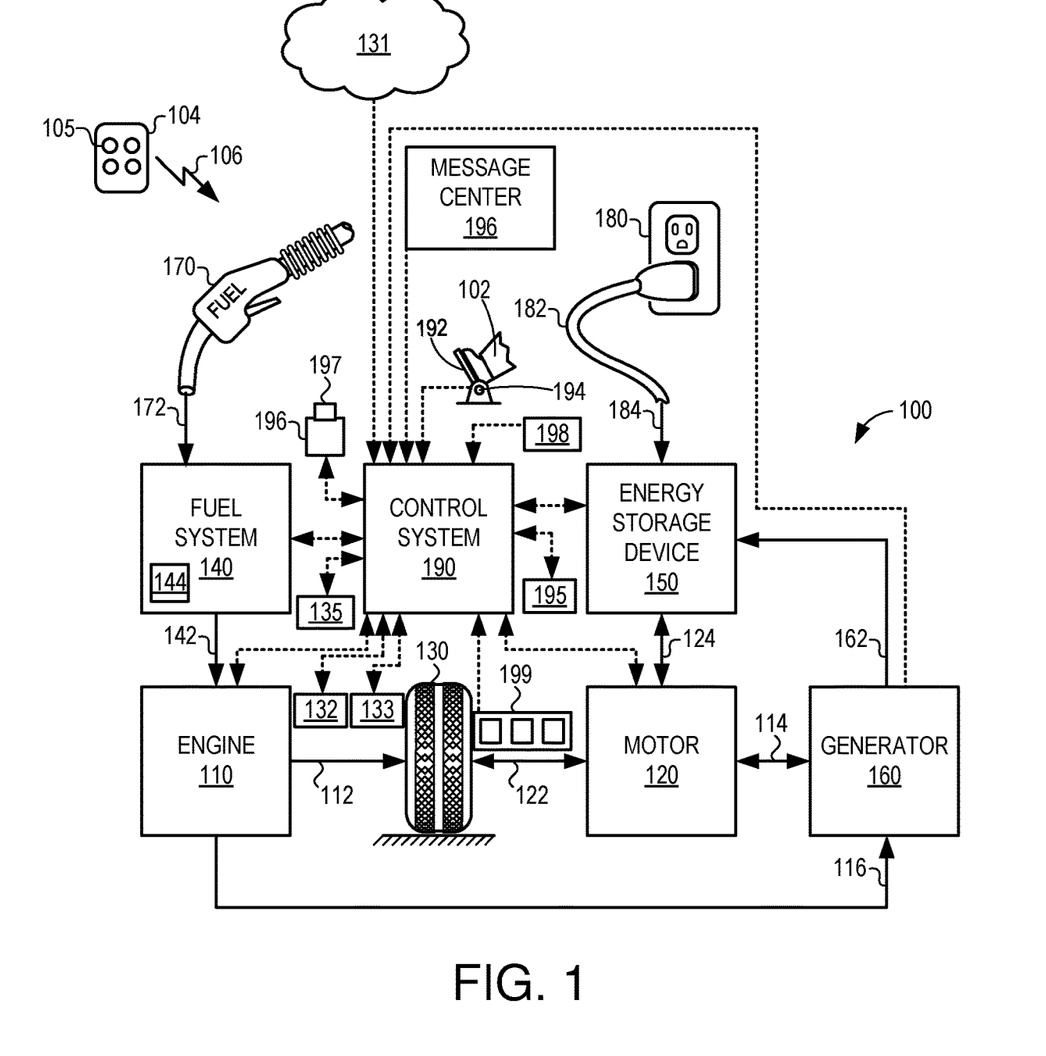
FIG. 1 illustrates a schematic of an engine included in a hybrid vehicle
Figure 2:
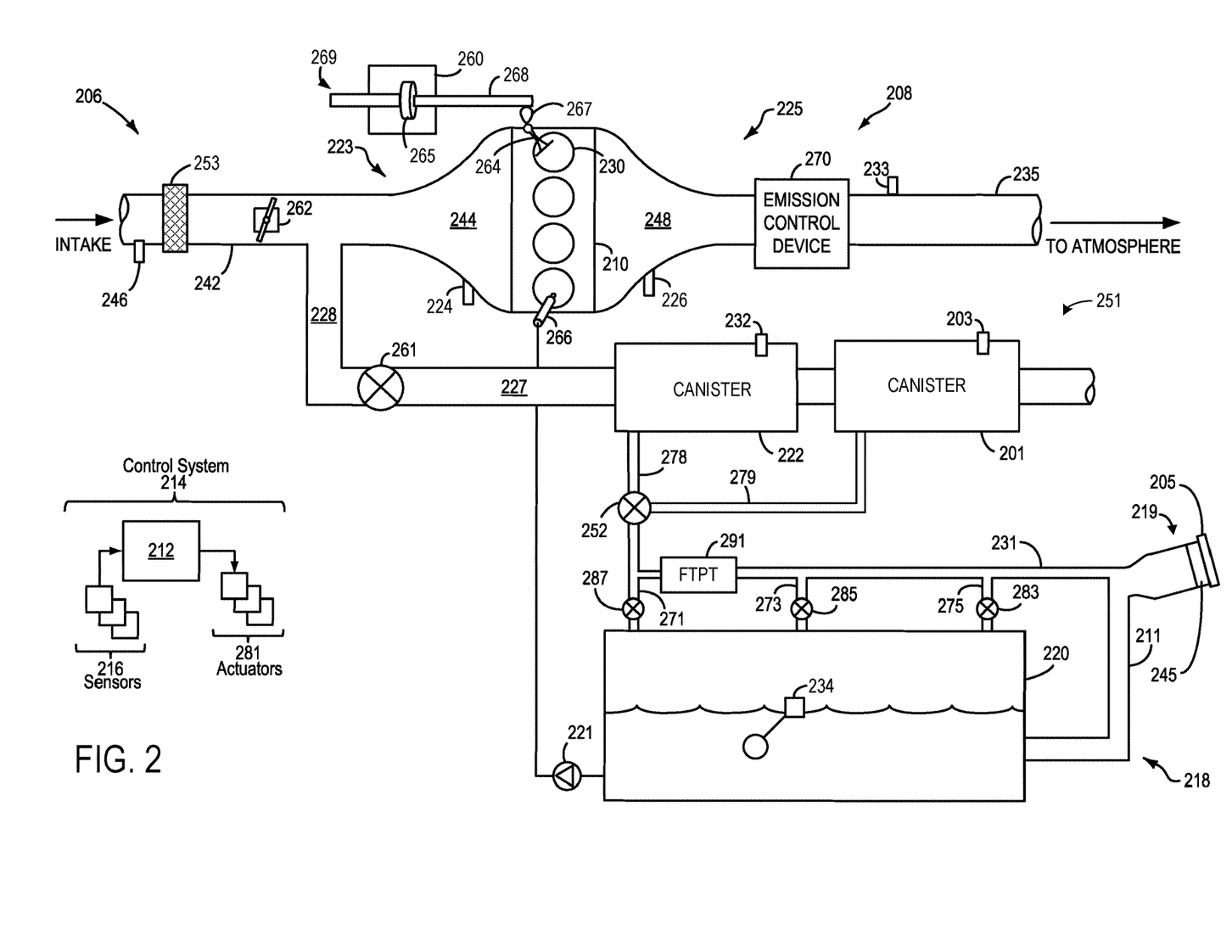
FIG. 2 illustrates an example of an engine including a plurality of canisters.
Figure 3:
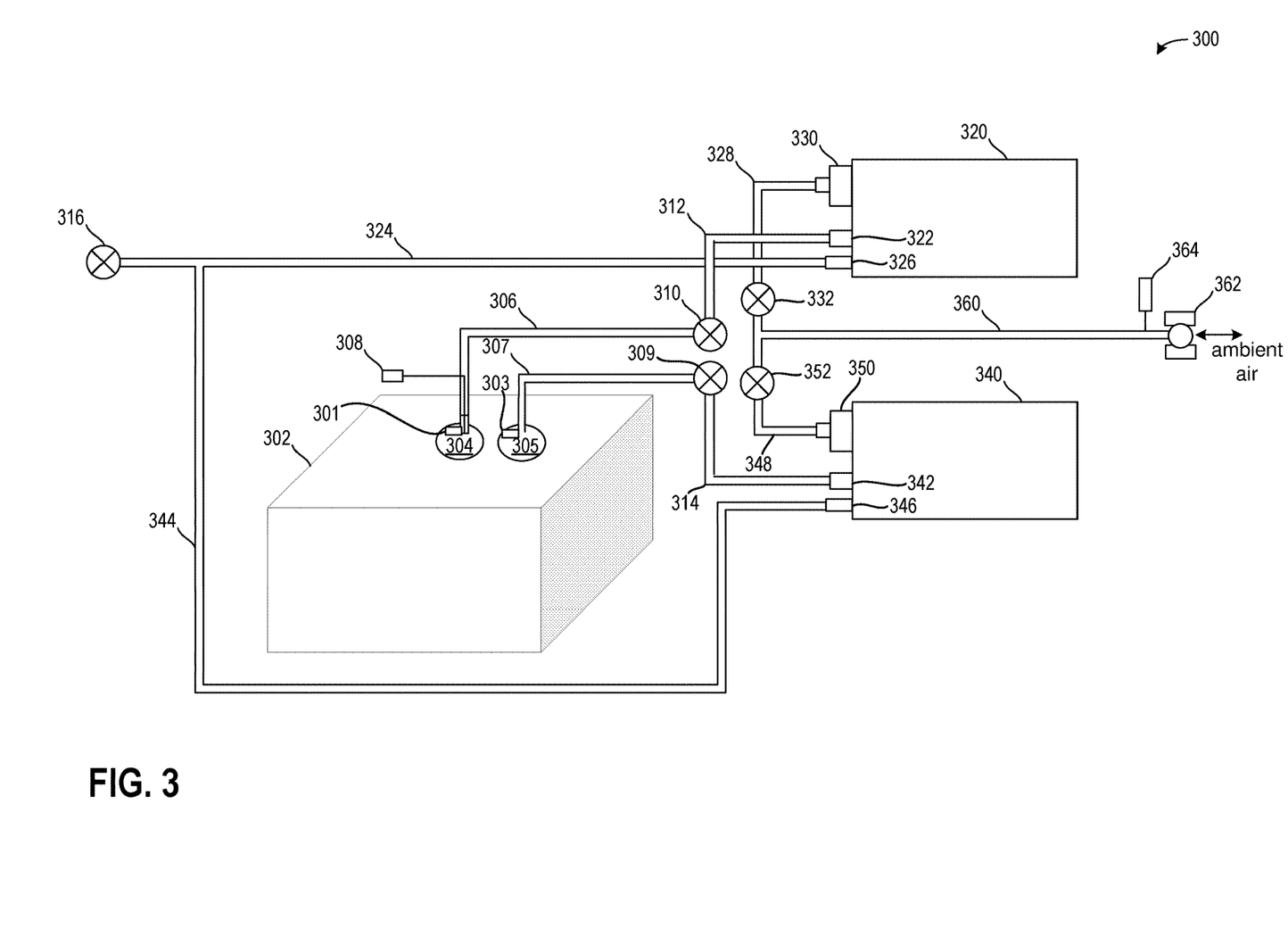
FIG. 3 illustrates a first embodiment of a fuel system including a plurality of canisters.
Figure 4:
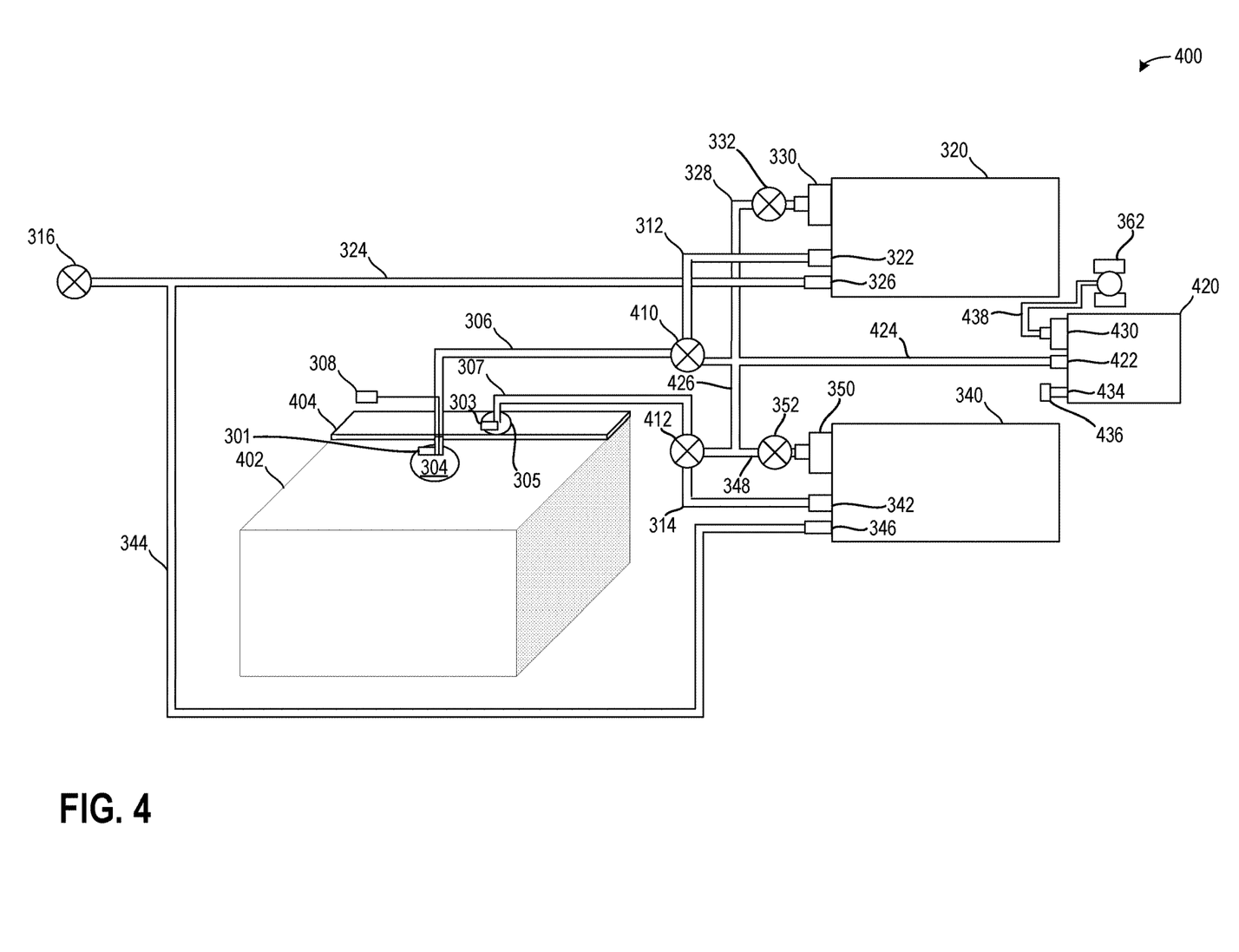
FIG. 4 illustrates a second embodiment of a fuel system including a plurality of canisters.
Figure 5:
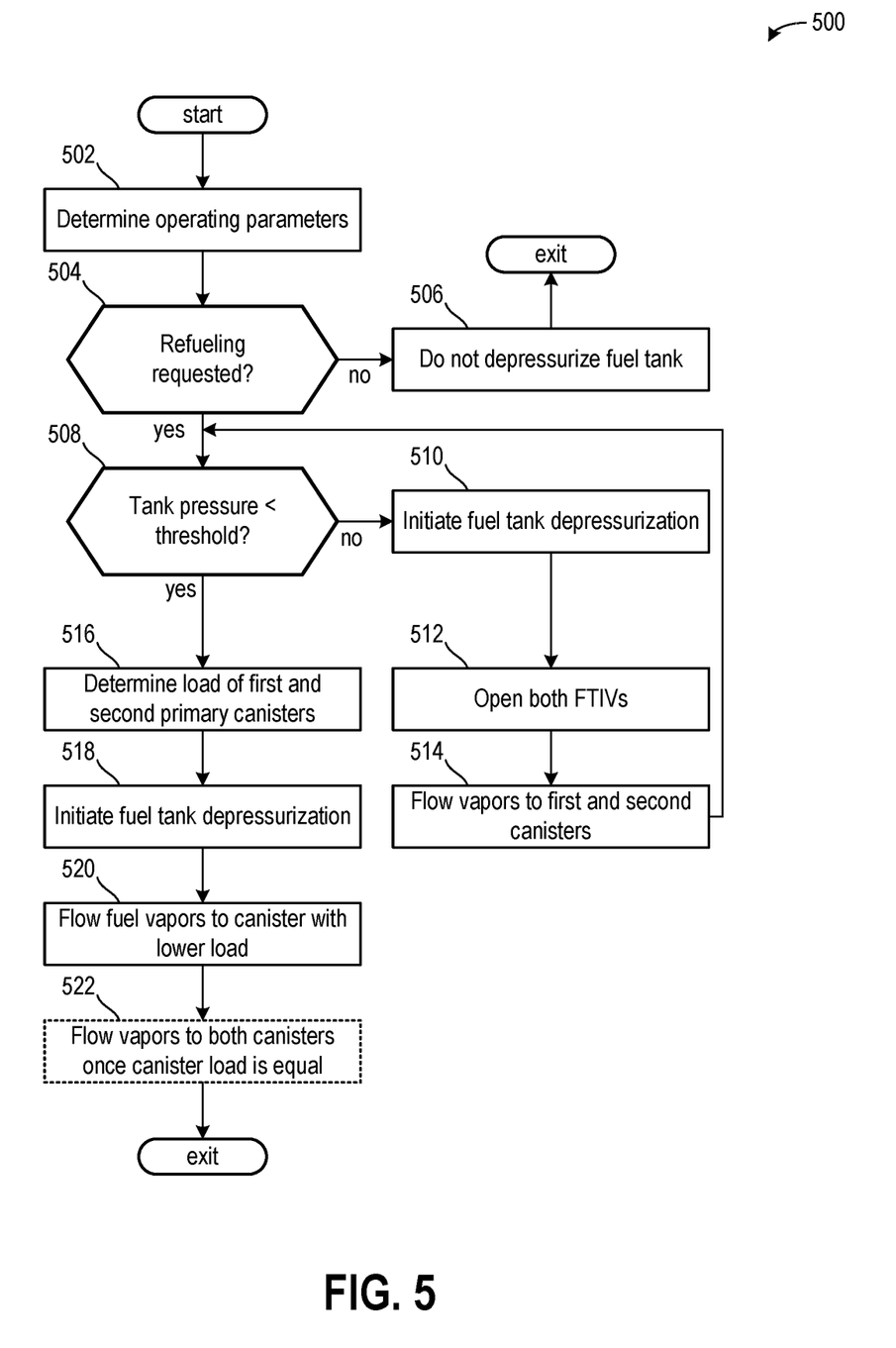
FIG. 5 illustrates a method for depressurizing a fuel tank of the fuel system based on a load of the plurality of canisters.
Figure 6:
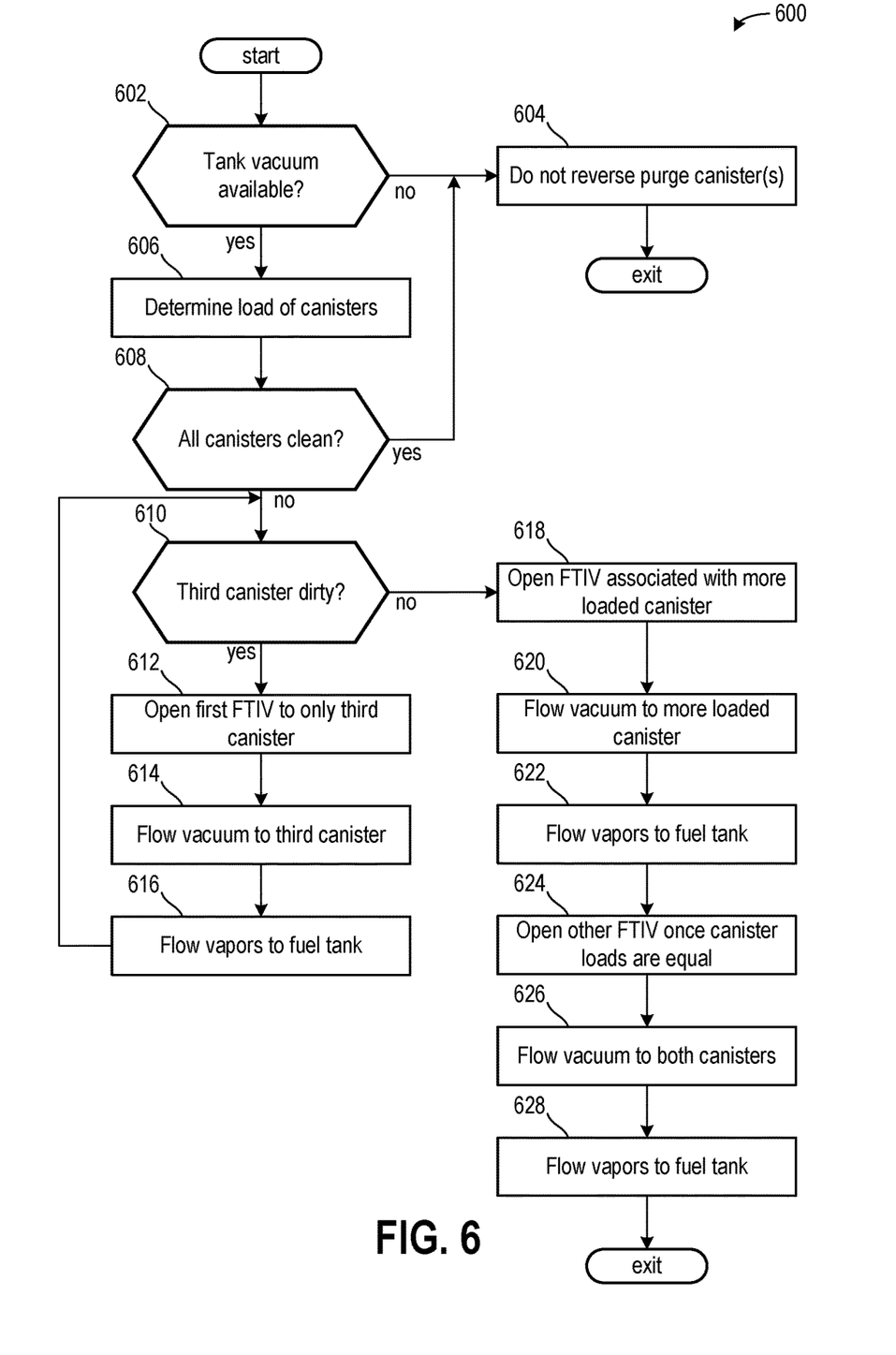
FIG. 6 illustrates a method for reverse purging one or more of the plurality of canisters based on a pressure of the fuel tank.
Figure 7:
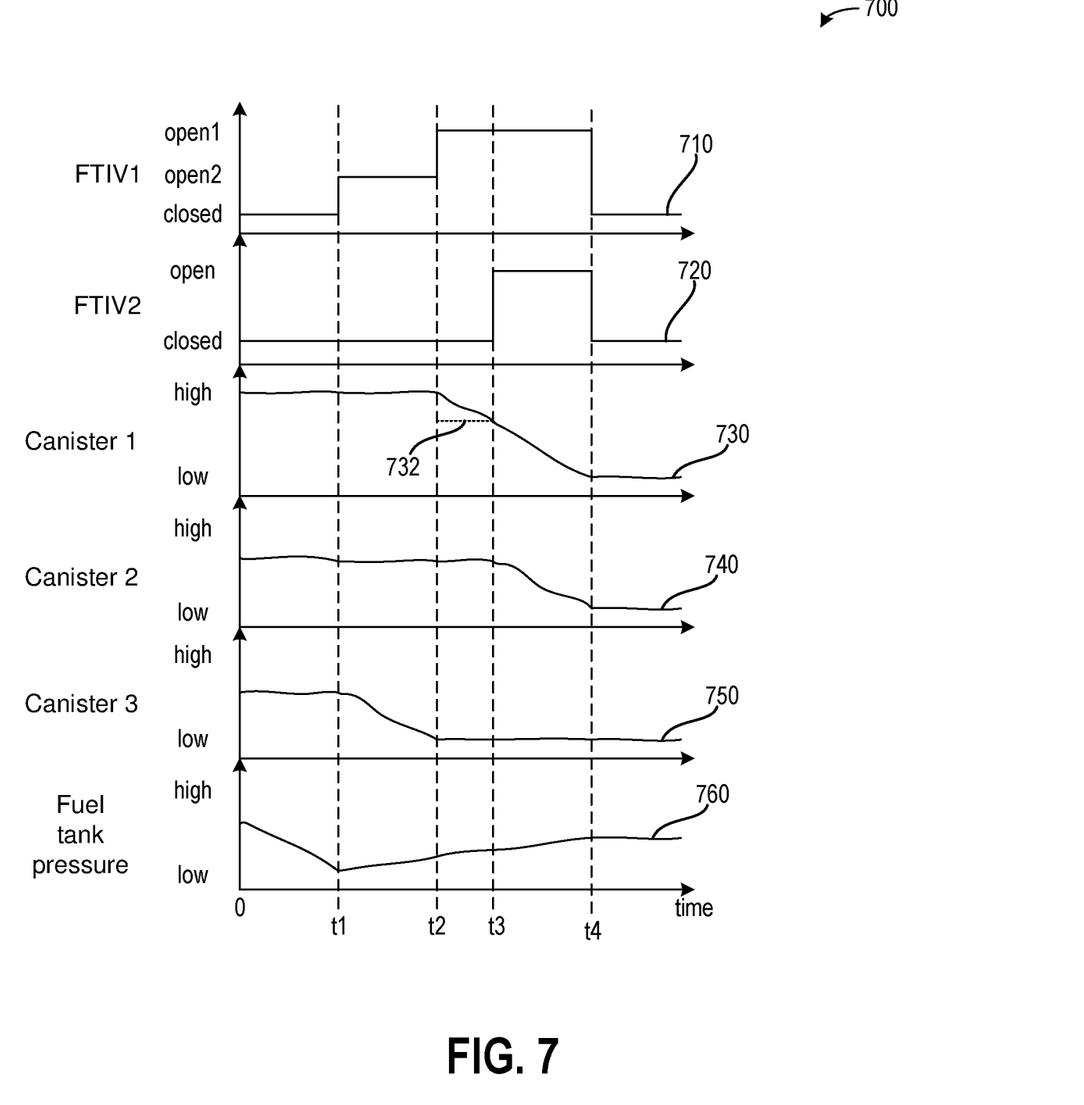
FIG. 7 illustrates changes in conditions of the fuel system while executing the method of FIG. 5

The following description relates to systems and methods for managing fuel tank pressures and canister loads for a fuel system. FIG. 1 illustrates a schematic of an engine included in a hybrid vehicle. FIG. 2. illustrates a prior art example of an engine including a single canister. FIG. 3 illustrates a first embodiment of a fuel system including a plurality of canisters. FIG. 4 illustrates a second embodiment of a fuel system including a plurality of canisters. FIG. 5 illustrates a method for depressurizing a fuel tank of the fuel system based on a load of the plurality of canisters. FIG. 6 illustrates a method for reverse purging one or more of the plurality of canisters based on a pressure of the fuel tank. FIG. 7 illustrates changes in conditions of the fuel system while executing the method of FIG. 5.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a speed reduction pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be automatically actuated or pressed by a vehicle operator to initiate refueling. For example, in response to the vehicle operator actuating refueling button 197, a fuel tank in the vehicle may be depressurized so that refueling may be performed.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example.

Vehicle system 100 may also include an on-board navigation system 132 (for example, a Global Positioning System) with which an operator of the vehicle may interact. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, etc. In some examples, vehicle system 100 may include lasers, radar, sonar, acoustic sensors 133, which may enable vehicle location, traffic information, etc., to be collected via the vehicle.

The vehicle system 100 may be in wireless communication with a wireless network 131. The control system 190 may communicate with the wireless network 131 via a modem, a router, a radio signal, or the like. Data regarding various vehicle system conditions may be communicated between the control system 190 and the wireless network. Additionally or alternatively, the wireless network 131 may communicate conditions of other vehicles to the control system 190.

FIG. 2 shows a schematic depiction of a prior art example of a vehicle system 206. The vehicle system 206 includes an engine system 208 coupled to an evaporative emissions control system 251 and a fuel system 218. Evaporative emissions control system 251 (also termed, evaporative emissions system 251) includes a first canister 222 and a second canister 201 which may be used to capture and store fuel vapors. While only two canisters are illustrated, the evaporative emission control system 251 may include three or more canisters. In some examples, vehicle system 206 may be a hybrid electric vehicle system, such as the vehicle propulsion system 100 of FIG. 1. As such, engine 210 may be similar to engine 110 of FIG. 1 while control system 214 of FIG. 2 may be the same as control system 190 of FIG. 1.

The engine system 208 may include an engine 210 having a plurality of cylinders 230. The engine 210 includes an engine intake 223 and an engine exhaust 225. The engine intake 223 includes a throttle 262 fluidly coupled to the intake manifold 244. Fresh intake air enters intake passage 242 and flows through air filter 253. Air filter 253 positioned in the intake passage 242 may clean intake air before the intake air is directed to the intake manifold 244. Cleaned intake air exiting the air filter 253 may stream past throttle 262 (also termed intake throttle 262) into intake manifold 244 via intake passage 242. As such, intake throttle 262 when fully opened may enable a higher level of fluidic communication between intake manifold 244 and intake passage 242 downstream of air filter 253. An amount of intake air provided to the intake manifold 244 may be controlled via throttle 262 based on engine conditions. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Each cylinder 230 may be serviced by one or more valves. In the present example, each cylinder 30 includes a corresponding intake valve 264 and an exhaust valve (not shown). Each intake valve 264 may be held at a desired position via a corresponding spring. Engine system 208 further includes one or more camshafts 268 for operating intake valve 262. In the depicted example, intake camshaft 268 is coupled to intake valve 264 and can be actuated to operate intake valve 264. In some embodiments, where the intake valve of a plurality of cylinders 230 are coupled to a common camshaft, intake camshaft 268 can be actuated to operate all the intake valves of all the coupled cylinders.

Intake valve 264 is actuatable between an open position that allows intake air into the corresponding cylinder and a closed position substantially blocking intake air from the cylinder. Intake camshaft 268 may be included in intake valve actuation system 269. Intake camshaft 268 includes intake cam 267 which has a cam lobe profile for opening intake valve 264 for a defined intake duration. The lobe profile may affect cam lift height, cam duration, and/or cam timing. A controller, such as controller 212, may be able to switch the intake valve duration by moving intake camshaft 268 longitudinally and switching between cam profiles.

It will be appreciated that the intake and/or exhaust camshafts may be coupled to cylinder subsets, and multiple intake and/or exhaust camshafts may be present. Intake valve actuation system 269 may further include push rods, rocker arms, tappets, etc. As such, the intake valve actuation system may include a plurality of electromechanical actuators. Such devices and features may control actuation of the intake valve 264 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 230 may each have more than one intake valve. In still other examples, each intake valve 264 of one or more cylinders may be actuated by a common camshaft. Further still, in some examples, some of the intake valves 264 may be actuated by their own independent camshaft or other device.

Engine system 208 may include variable valve timing systems, for example, variable cam timing VCT system 260. As such, VCT system 260 may be operatively and communicatively coupled to the intake valve actuation system 269. VCT system 260 may include an intake camshaft phaser 265 coupled to the common intake camshaft 268 for changing intake valve timing. VCT system 260 may be configured to advance or retard valve timing by advancing or retarding cam timing and may be controlled by controller 212. In some embodiments, valve timing such as intake valve closing (IVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 260. As such, the valve actuation systems described above may enable closing the intake valves to block fluid flow therethrough, when desired.

Though not shown in FIG. 2, vehicle system 206 may also include an exhaust gas recirculation (EGR) system for routing a desired portion of exhaust gas from the exhaust passage 235 to the intake manifold 244 via an EGR passage. The amount of EGR provided may be varied by controller 212 via adjusting an EGR valve in the EGR passage. By introducing exhaust gas to the engine 210, the amount of available oxygen for combustion is decreased, thereby reducing combustion flame temperatures and reducing the formation of NOx, for example.

Fuel system 218 may include a fuel tank 220 coupled to a fuel pump system 221. The fuel pump system 221 may include one or more pumps for pressurizing fuel delivered to the injectors of engine 210, such as the example injector 266. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol percentages or amounts, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to evaporative emissions control system 251, which includes the first fuel vapor canister 222 and the second fuel canister 201, via vapor recovery line 231. The first fuel vapor canister 222 may also be simply termed first canister 222 and the second fuel vapor canister 201 may be termed second canister 201 herein. Fuel vapors stored in first canister 222 and the second canister 201 may be purged to the engine intake 223 at a later time. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219 (or refueling system 219). In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a clutch, which, when engaged, prevents the removal of the fuel cap. The clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Evaporative emissions control system 251 may include one or more emissions control devices, such as one or more fuel vapor canisters filled with an appropriate adsorbent. The canisters are configured to temporarily trap fuel vapors (including vaporized hydrocarbons) during fuel tank refilling operations and "running loss" (that is, fuel vaporized during vehicle operation). In one example, the adsorbent used is activated charcoal. Evaporative emissions system 251 may further include a canister ventilation path or vent line 227 which may route gases out of the canister 222 to the atmosphere when storing, or trapping, fuel vapors from fuel system 218.

Vent line 227 may allow fresh air to be drawn into canister 222 when purging stored fuel vapors from first canister 222 and second canister 201 to engine intake 223 via purge line 228 and canister purge valve 261 (also termed, purge valve 261). For example, purge valve 261 may be normally closed but may be opened during certain conditions so that vacuum from engine intake manifold 244 is provided to the fuel vapor canister 222 for purging.

FTIV 252 may be positioned between the fuel tank 220, the first canister 222, and the second canister 201 within conduit 278. FTIV 252 may be a normally closed valve, that when opened, allows for the venting of fuel vapors from fuel tank 220 to only first canister 222 via conduit 278, only second canister 201 via conduit 279, or both. Fuel vapors may be stored within the first canister 222 and the second canister 201, stripped off fuel vapors, may then be vented to atmosphere via vent line 227. Fuel vapors stored in first canister 222 and the second canister 201 may be purged along purge line 228 to engine intake 223 via canister purge valve 261 at a later time when purging conditions exist. As such, FTIV 252 when closed may isolate and seal the fuel tank 220 from the evaporative emissions system 251. It will be noted that certain vehicle systems may not include FTIV 252.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open FTIV 252 while closing canister purge valve (CPV) 261 to direct refueling vapors into first and second canisters and preventing fuel vapors from being directed into the intake manifold.

As another example, the fuel system may be operated in a refueling mode (e.g., when fuel tank refueling is requested by a vehicle operator), wherein the controller 212 may open FTIV 252, while maintaining CPV 261 closed, to depressurize the fuel tank before allowing fuel to be added therein. As such, FTIV 252 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine running), wherein the controller 212 may open CPV 261 while closing FTIV 252. Herein, the vacuum generated by the intake manifold of the operating engine may be used to draw fresh air through vent line 227 and through the first canister 222 and the second canister 201 to purge the stored fuel vapors into intake manifold 244. In this mode, the purged fuel vapors from the canister are combusted in the engine. The purging may be continued until the stored fuel vapor amount in the canister is below a threshold. The FTIV 252 may be closed during the purging mode.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include manifold absolute pressure (MAP) sensor 224, barometric pressure (BP) sensor 246, exhaust gas sensor 226 located in exhaust manifold 248 upstream of the emission control device, temperature sensor 233, fuel tank pressure sensor 291 (also termed a fuel tank pressure transducer or FTPT), and canister temperature sensors 232, 203. Other sensors such as pressure, temperature, air/fuel ratio, and composition sensors may be coupled to various locations in the vehicle system 206. As another example, the actuators may include CPV 261, fuel injector 266, throttle 262, FTIV 252, fuel pump 221, and refueling lock 245. The control system 214 may include a controller 212. The controller may receive input data from the various sensors, process the input data, and trigger the actuators in response to the processed input data based on instruction or code programmed therein corresponding to one or more routines.

The controller 212 receives signals from the various sensors of FIG. 2 and employs the various actuators of FIG. 2 to adjust engine operation based on the received signals and instructions stored on a memory of the controller. For example, adjusting the canister purge valve may include adjusting an actuator of the canister purge valve to adjust a flow rate of fuel vapors therethrough. As such, controller 212 may communicate a signal to the actuator (e.g., canister purge valve solenoid) of the canister purge valve based on a desired purge flow rate. Accordingly, the canister purge valve solenoid may be opened (and pulsed) at a specific duty cycle to enable a flow of stored vapors from canisters to intake manifold 244 via purge line 228.

Turning now to FIG. 3, it shows an embodiment of a fuel system 300. The fuel system 300 may be used in the engine system of FIGS. 1 and/or 2. The fuel system 300 may include a fuel tank 302 configured to store one or more fuels. In one example, the fuel tank 302 may be similar to the fuel tank 220 of FIG. 2. In one example, the fuel tank 302 is a non-integrated refueling only canister system (NIRCOS) fuel tank. The fuel tank 302 may include a first port 304 to which a first load line 306 is fluidly coupled. The first load line 306 may be configured to flow fuel vapors to and/or from the fuel tank 302. A FTPT 308 may be coupled to the fuel tank 302 at a location proximal to the first load line 306.

The fuel tank 302 may further include a second port 305 to which a second load line 307 is fluidly coupled. The second load line 307 may be configured to flow fuel vapors to and/or from the fuel tank 302.

The fuel tank 302 may further include a first fuel limit vent valve (FLVV) 301 at the first port 304. A second FLVV 303 may be arranged at the second port 305. In one example, a grade vent valve (GVV) that would otherwise be arranged at the second port 305, may be omitted. By doing this, the weight of the second FLVV 303 may be offset.

The fuel system 300 includes a first canister 320 and a second canister 340 coupled to the first load line 306 and the second load line 307, respectively. In this way, the fuel system 300 may be differentiated from the fuel system of FIG. 2.

A first fuel tank isolation valve (FTIV) 310 may be arranged at a junction between the first load line 306 and a first canister load line 312. The first canister load line 312 may be coupled to the first FTIV 310 and a first canister inlet port 322. A second FTIV 309 may be coupled to a second canister load line 314 and to second load line 307. The second canister load line 314 may be coupled to the second FTIV 309 and a second canister inlet port 342. In some embodiments, the first FTIV 310 and the second FTIV 309 may be combined and the fuel system 300 modified to include the multi-position FTIV 252 of FIG. 2 in a position to control multiple flows to the canisters.

The first FTIV 310 and the second FTIV 309 may be actuated to a fully open, a fully closed, or positions therebetween. In some examples, the first FTIV 310 and the second FTIV 309 may be adjusted based on loads of the first canister 320 and the second canister 340 in response to conditions, as described in methods of FIGS. 5 and 6. In one example, the first FTIV 310 and the second FTIV 309 are multi-position two-way valves.

Each of the first canister 320 and the second canister 340 may be coupled to a CPV 316. In one example, the CPV 316 may be identical to CPV 261 of FIG. 2. The CPV 316 may direct vapors to an engine intake during conditions, such as when combustion is occurring and fuel is being consumed. The first canister 320 may comprise a first canister purge line 324 and the second canister 340 may comprise a second canister purge line 344. The first canister purge line 324 may be coupled to the first canister 320 at a first canister purge port 326. The second canister purge line 344 may be coupled to the second canister 340 at a second canister purge port 346. The first canister purge line 324 and the second canister purge line 344 may intersect upstream of the CPV 316 relative to a direction of vapor flow towards the engine intake. When vapors flow from the one or more of the first canister 320 and the second canister 340, through the CPV 316, and to the engine, a canister cleaning is occurring and a load of the canister(s) may be reduced to a less loaded state.

Each of the first canister 320 and the second canister 340 may further include corresponding vent lines. The first canister 320 may include a first canister vent line 328 coupled to a first canister vent port 330 and a first canister vent valve (CVV1) 332. The second canister 340 may include a second canister vent line 348 coupled to a second canister vent port 350 and a second CVV (CVV2) 352. The first and second canister vent lines 328, 348 may be fluidly separated from one another.

An evaporative leak check module (ELCM) 362 may be fluidly coupled to each of the first canister vent line 328 and the second canister vent line 348 at a location downstream of the CVV1 332 and the CVV2 352 relative to a direction of vapor flow via a combined vent passage 360. An ELCM sensor 364 may be arranged between the ELCM 362, the CVV1 332, and the CVV2 352. In one example, the ELCM 362 and the ELCM sensor 364 may be used to execute a leak detection diagnostic of the fuel system 300. In some examples, such as examples where the vehicle includes only an internal combustion engine, the ELCM 362 and the ELCM sensor 364 may be omitted and each of the first canister vent line 328 and the second canister vent line 348 may be open to atmosphere. If the ELCM 362 is omitted, a dust box or similar device may be included between the fuel system and atmosphere.

In one example, a length and a diameter of the lines to and from the canisters may be substantially identical. That is to say, a length and a diameter of the first load line 312 and the second load line 314 may be identical. A length and a diameter of the first canister purge line 324 and the second canister purge line 344 may be identical. A length and a diameter of the first canister vent line 328 and the second canister vent line 348 may be identical. A size, a shape, and a volume, including carbon bed, of the first canister 320 and the second canister 340 may be identical. By doing this, restrictions of the canisters may be substantially identical, thereby promoting more even vapor flow.

Turning now to FIG. 4, it shows a fuel system 400. The fuel system 400 may include one or more elements identical to the elements of the fuel system 300 of FIG. 3. As such, unchanged components from FIG. 3 are similarly numbered in FIG. 4.

The fuel system 400 may include a fuel tank 402. The fuel tank 402 may include the first port 304 and the second port 305 arranged at different heights. In one example, the first port 304 may include the first FLVV 301 and the second port 305 may include the second FLVV 303. The fuel tank 402 may include a step 404 or other protrusion on which the second port 305, and therefore the second FLVV 303, is arranged, to differentiate its height from the first port 304. By doing this, a condition of the first FLVV 301 and the second FLVV 303 may be determined via a diagnostic or other routine.

In some examples, additionally or alternatively, the shape and configuration of the fuel tank 402 may be identical to the fuel tank 302 of FIG. 3. The fuel tank 402 may be arranged at an angle or a slope in order to arrange the FLVVs at different heights.

The fuel system 400 may further include a third canister 420. The third canister 420 may be different than the first canister 320 and the second canister 340 in one or more of size and shape. In one example, the third canister 420 is smaller than the first canister 320 and the second canister 340.

The third canister 420 may include a third canister inlet port 422 fluidly coupled to a third load line 424. The third load line 424 may extend from the third canister inlet port 422 to a first FTIV 410. A connecting passage 426 may extend from the third load line 424 to the second canister vent line 348. As such, a four-way intersection may be present between the first canister vent line 328, the third load line 424, the connecting passage 426.

The third canister 420 may further include a third canister purge port 434. A cap 436 may be coupled to the third canister purge port 434. The cap 436 may hermetically seal the third canister purge port 434.

The third canister 420 may further include a third canister vent port 430. The third canister vent port 430 may be fluidly coupled to a third canister vent line 438. The third canister vent line 438 may fluidly couple the third canister 420 to atmosphere. Additionally or alternatively, the ELCM 362 may be arranged between the third canister vent port 430 and atmosphere. Furthermore, the third canister 420 is positioned between atmosphere and each of the first canister 320 and the second canister 340.

In one example, operation of the fuel system 400 may include operating the third canister 420 as an emission limiting device, wherein the third canister 420 traps vapors that may otherwise flow to atmosphere. Therefore, canister cleaning may include prioritizing cleaning the third canister 420 prior to the first canister 320 and the second canister 340. Methods for operating the fuel system 400 and the fuel system 300 of FIG. 3 are described in greater detail below.

In the example of the fuel system 400, the first FTIV 410 may be a multi-position valve configured to control a fluid connection between the fuel tank 402 and one or more of the first canister load line 312, the third canister load line 424, the first canister vent line 328, and the second canister vent line 348. A fully closed position of the first FTIV 410 may seal the fuel tank 402 from each of the first primary canister 320, the second primary canister 340, and the third canister

420. A first open position of the first FTIV 410 may fluidly couple the fuel tank 402 to the first canister load line 312.

A second open position of the first FTIV 410 may fluidly couple the fuel tank 402 to the third canister load line 424. When in the second open position, positions of the CVV1 332 and the CVV2 352 may be adjusted to control vapor flow in and/or out of the first primary canister 320 and the second primary canister 340, respectively.

A third open position of the first FTIV 410 may fluidly couple the fuel tank 402 to each of the first canister load line 312 and the third canister load line 424. As such, at least each of the first primary canister 320 and the third canister 420 are fluidly coupled to the fuel tank when the first FTIV 410 is in the third open position.

Additionally or alternatively, in the example of the fuel system 400, a second FTIV 412 may be a multi-position valve configured to control a fluid coupling between the fuel tank 402 and one or more of the second canister load line 314 and the second canister vent line 348. Due to the configuration of the second canister vent line 348, the second FTIV 412 may therefore also control a fluid coupling between the fuel tank 402, the third canister load line 424, and the first canister vent line 328.

The second FTIV 412 may include a fully closed position that seals the fuel tank 402 from each of the second canister load line 314 and the second canister vent line 348. The second FTIV 412 may further include a first open position that fluidly couples the fuel tank 402 to only the second canister load line 314.

The second FTIV 412 may further include a second open position that fluidly couples the fuel tank 402 to only the second canister vent line 348. As such, the fuel tank 402 may be sealed from the second canister load line 314 when the second FTIV 412 is in the second open position.

The second FTIV 412 may further include a third open position that fluidly couples the fuel tank 402 to each of the second canister load line 314 and the second canister vent line 348.

In one example, when the first FTIV 410 is in the third open position, the CVV1 332 may be commanded closed. Additionally or alternatively, the second FTIV 412 may be commanded to one of the first open position or the fully closed position when the first FTIV is in the second and/or third open positions.

In another example, additionally or alternatively, when the second FTIV 412 is in the third open position, the CVV2 352 may be commanded closed. Additionally or alternatively, the first FTIV 410 may be commanded to the first open position or a fully closed position when the second FTIV 412 is in the second or third open positions.

The first FTIV 410 and the second FTIV 412 may actuated to varying magnitudes of openness for each of the associated open positions. Varying degrees of openness may range from greater than 0% open to 100% open. As such, precision control of vapor flow through the passages may be realized.

Turning now to FIG. 5, it shows a method 500 for adjusting a fuel tank vapor flow path during a depressurization based on a load of a plurality of canisters. Instructions for carrying out method 500 and the rest of the methods included herein may be executed by a controller based on instructions stored on a memory of the controller and in conjunction with signals received from sensors of the engine system, such as the sensors described above with reference to FIGS. 1-4. The controller may employ engine actuators of the engine system to adjust engine operation, according to the methods described below.

The method 500 begins at 502, which includes determining operating parameters. Operating parameters may include, but are not limited to, one or more of a vehicle speed, an engine speed, a gear selected, and an air/fuel ratio.

At 504, the method 500 may include determining if refueling is requested. Refueling may be requested if one or more of a refueling door is opened, if the operator requests the refueling door to be opened, and if the vehicle is located at a fuel station. The refueling door may be opened or requested to be opened via the operator pressing against an exterior of the refueling door, depressing a button in a vehicle cabin interior, and/or via a selection through an electronic device, such as a phone, laptop, tablet, navigation system, or the like. The vehicle may be determined to be located at a refueling station based on data provided by a location sensor and/or navigation system. The location sensor may be a global positioning satellite (GPS) sensor or other type of sensor.

If refueling is not requested, then at 506, the method may include where the fuel tank is not depressurized and vapors may be contained therein. As such, each of the FTIV valves may remain in fully closed positions.

If refueling is requested, then the method 500 may proceed to 508, which includes determining if a fuel tank pressure is less than a threshold pressure. The threshold pressure may correspond to a fuel tank pressure in which a depressurization time is longer than a desired duration. If the tank pressure is not less than the threshold pressure, then depressurizing the fuel tank by opening only one FTIV may take longer than the desired duration and the method 500 may proceed to 510, which includes initiating fuel tank depressurization.

At 512, the method 500 may include opening both the FTIVs. As such, the first FTIV is opened and the second FTIV is opened and both the first primary canister and the second primary canister are fluidly coupled to the fuel tank. In one example, the first and second FTIVs are opened to corresponding first open positions. By doing this, vapors from the fuel tank may not flow directly to the third canister. More specifically, the third canister may be sealed from the fuel tank during the depressurization. The first FTIV may be in its first open position such that fuel vapors from the fuel tank may flow to only the first primary canister and block vapor flow to the third canister. The second FTIV may be in its first open position such that fuel vapors from the fuel tank may flow to only the second primary canister. In this way, the third canister may be in a position to catch vapors that may leak from the first primary canister and/or the second primary canister.

At 514, the method 500 may include flowing vapors to both of the first primary canister and the second primary canister. The method may continue to monitor the fuel tank pressure and once the pressure is less than the threshold pressure, then only the less loaded of the two primary canisters may receive fuel tank vapors, as will be described below.

Returning to 508, if the tank pressure is less than the threshold pressure, then the depressurization of the fuel tank may occur in a shorter period than the desired duration with only one FTIV open. The method 500 proceeds to 516 (yes at 508), which includes determining a load of the first primary canister and the second primary canister. The load of the canisters may be determined based on one or more of a temperature of the canisters, feedback from an oxygen sensor positioned at an inlet of the canisters, and feedback from a hydrocarbon sensor positioned at the inlet of the canisters. Additionally or alternatively, the load of the canisters may be tracked over time based on one or more of an ambient temperature, a fuel tank pressure, and an engine run time.

At 518, the method 500 may include initiating a fuel tank depressurization.

At 520, the method 500 may include flowing fuel vapors to a less loaded of the first primary canister and the second primary canister. As such, the loads of the first primary canister and the second primary canister may be compared and the canister with the lower load may be selected to receive vapors from the fuel tank during the depressurization. As such, the FTIV corresponding to the canister with the lower load may be opened and the FTIV corresponding to the canister with the higher load may be held closed. For example, if the first primary canister comprises a lower load than the second primary canister, then the first FTIV may be opened to the first open position and the second FTIV may be held closed. Alternatively, if the second primary canister comprises a lower load than the second primary canister, then the first FTIV may be held closed and the second FTIV may be opened to the first open position.

If the loads of the first primary canister and the second primary canister are equal, then the method may include selecting one of the two canisters to receive vapors. The canister selected may be based on one or more of a canister age and a canister previously selected. In one example, the canister with a lower canister age may be selected. Additionally or alternatively, the method may alternate between the canister selected such that if the first primary canister was selected during a previous depressurization, then the second primary canister may be selected to receive vapors during a current depressurization.

At 522, the method 500 may optionally include flowing vapors to both canisters once canister loads are equal. Flowing vapors to both primary canisters may include opening the first FTIV and the second FTIV to corresponding first open position. Additionally or alternatively, loads of the primary canisters may be balanced by flowing vapors directly from one canister to the other based on actuation of the corresponding vent valves. A third canister load valve may be optionally arranged in the third load line to control vapor flow to the third canister, if the third canister is included in the fuel system executing the method 500 of FIG. 5.

Turning now to FIG. 6, it shows a method 600 for reverse purging one or more canisters of the fuel system. The method 600 begins at 602, which may include determining if a tank vacuum is available. Tank vacuum may be available if a temperature of the fuel tank changes by a threshold amount. The threshold amount may be equal to 10 degrees, or 20 degrees, or 30 degrees, or 40 degrees, or 50 degrees or more. Additionally or alternatively, tank vacuum may be available during the night (e.g., after sunset and before sunrise) when ambient temperatures are cooler. Additionally or alternatively, tank vacuum availability may be determined via a pressure sensor. If tank vacuum is not available, then at 604, the method 600 may include not reverse purging the canisters. As such, vapor from the canisters is not directed to the fuel tank via vacuum.

If tank vacuum is available, then at 606, the method 600 may include determining a load of the canisters.

At 608, the method 600 may include determining if each of the canisters is clean. The canisters may be cleaning during a purge event which may include flowing vapors from the primary canisters to the engine, wherein the vapors are combusted. The third canister may be cleaned by flowing vapors therefrom to one or more of the first primary canister and the second primary canister.

If the canisters are clean, then the method 600 may proceed to 604 and reverse purging may not occur. If each of the canisters is not clean, then the method 600 proceeds to 610, which includes determining if the third canister is dirty. The third canister is dirty if a third canister load is greater than a lower threshold load. In one example, the lower threshold load is equal to 0. Additionally or alternatively, the lower threshold load may be based on a percentage of a capacity of the third canister, such as 5%, or 3%, or 1%.

If the third canister is dirty, then the method 600 proceeds to 612, which includes opening the first FTIV to the second open position which fluidly couples the fuel tank to only the third canister. In this way, vacuum flow is prioritized to the third canister. Additionally or alternatively, CVV1 and CVV2 may be maintained fully closed to block vacuum from entering the first primary canister and the second primary canister. The second FTIV may be maintained fully closed.

In some examples, additionally or alternatively, the second FTIV may be actuated to the second open position and CVV1, CVV2, and the first FTIV may be maintained fully closed to flow vacuum to the third canister. In further examples, additionally or alternatively, each of the first FTIV and the second FTIV may be actuated to corresponding second open positions and CVV1 and CVV2 may be maintained closed to flow vacuum to only the third canister.

At 614, the method 600 may include flowing vacuum to the third canister. Vacuum may flow through the first load line, through the first FTIV, through the third load line, through the third canister inlet port, and into the third canister.

At 616, the method 600 may include flowing vapors from the third canister to the fuel tank. As such, a load of the third canister is reduced. The method 600 may continue to monitor the third canister load and once the third canister is no longer dirty then vacuum from the fuel tank may be supplied to one or more of the primary canisters.

Returning to 610, if the third canister is not dirty (e.g., its load is less than or equal to the lower threshold load) or if the third canister has been cleaned via the fuel tank vacuum, then at 618, the method 600 may include opening the FTIV associated with the more loaded of the primary canisters. For example, if the second primary canister is more loaded than the first primary canister, then the second FTIV may be opened to its first open position and the first FTIV may be held closed. As another example, if the first primary canister is more loaded than the second primary canister, then the first FTIV may be opened to its first open position and the second FTIV may be held closed.

At 620, the method 600 may include flowing vacuum to the more loaded primary canister. Vacuum may flow from the fuel tank, through a corresponding load line, through a corresponding FTIV, and into the more loaded primary canister.

At 622, the method 600 may include flowing vapors to the fuel tank. The vapors may flow in the opposite direction of the vacuum. A load of the more loaded primary canister is reduced.

At 624, the method 600 may include opening the other FTIV once the primary canister loads are equal. In this way, each of the first and second FTIVs may be opened to corresponding first open positions such that vacuum flows to the first and second primary canisters.

Additionally or alternatively, one of first FTIV or the second FTIV may be commanded to the third open position and the other maintained fully closed. For example, if the first FTIV is commanded to the third open position, then the second FTIV may be maintained closed. Furthermore, CVV1 may be maintained closed and CVV 2 may be commanded to an open position. In this configuration, vacuum may continue to flow to the third canister, which may increase a likelihood that the third canister is cleaned. In another examples, if the first FTIV is commanded to its third open position, then the first FTIV may be maintained closed. Additionally, CVV1 may be commanded open and CVV2 may be commanded closed. Vacuum may flow to the third canister.

At 626, the method 600 may include flowing vacuum to the first and second primary canisters.

At 628, the method 600 may include flowing vapors from the primary canisters to the fuel tank. In this way, a load of the first and second primary canisters may be reduced. In one example, the load of the first and second primary canisters is reduced simultaneously.

Turning now to FIG. 7, it shows a graph 700 illustrating an operating sequence for the fuel system including a plurality of canisters. Plot 710 illustrates a first FTIV position. Plot 720 illustrates a second FTIV position. Plot 730 illustrates a first primary canister load and dashed line 732 illustrates a load at which the first primary canister load is equal to a second primary canister load. Plot 740 illustrates the second primary canister load. Plot 750 illustrates a third canister load. Plot 760 illustrates a fuel tank pressure. As the fuel tank pressure decreases, more vacuum may be available for reverse purging. Time increases from a left to a right side of the figure.

Prior to t1, the fuel tank pressure begins to decrease. This may be due to an ambient temperature decreasing, which may occur following sunset and prior to sunrise. As such, vacuum may generate in the fuel tank. At t1, the first FTIV may commanded to move from the fully closed position to a second open position. As such, the fuel tank may be fluidly coupled to the third canister and vacuum flows from the fuel tank to the third canister. In one example, the second open position may also gases to flow only between the fuel tank and the third canister. In this way, the first primary canister and the second primary canister may be sealed from the fuel tank and the third canister.

Between t1 and t2, the fuel tank vacuum flows to the third canister. Vapors from the third canister are drawn out and directed to the fuel tank. The third canister load is reduced.

At t2, the third canister is cleaned and its load less than a lower threshold. As such, the third canister may no longer request reverse purging. The first FTIV is commanded from the second open position to a first open position. By doing this, the third canister is sealed from the fuel tank and the first primary canister is fluidly coupled to the fuel tank. The first primary canister may receive vacuum prior to the second primary canister due to a first canister load being greater than a second canister load.

Between t2 and t3, the fuel tank vacuum flows to the first primary canister. Vapors from the first primary canister flow to the fuel tank, thereby increasing the fuel tank pressure and decreasing the load of the first primary canister.

At t3, the first primary canister load is equal to the second primary canister load. The second FTIV is commanded to an open position. Each of the first primary canister and the second primary canister are fluidly coupled to the fuel tank.

Between t3 and t4, the fuel tank vacuum flows to each of the first primary canister and the second primary canister. Loads of the first primary canister and the second primary canister decrease at substantially equal rates. The fuel tank pressure increases.

At t4, the first primary canister and the second primary canister are clean. The primary canisters may no longer demand reverse purging. As such, the first FTIV and the second FTIV may be moved to fully closed position. In this way, the fuel tank may be sealed from each of the first primary canister, the second primary canister, and the third canister.

After t4, the fuel tank pressure remains constant. The loads of the canisters remain unchanged.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel system, comprising:
   a fuel tank;
   a first canister coupled to a first canister load line extending from a first port of the fuel tank;
   a second canister coupled to a second canister load line extending from a second port of the fuel tank, wherein the second port and the first port are arranged at different heights;
   a third canister; and
   a first fuel tank isolation valve (FTIV) configured to fluidly couple the fuel tank to a first canister vent line, a second canister vent line, and a third canister vent line.

2. The fuel system of claim 1, further comprising a second FTIV configured to fluidly couple the fuel tank to the second canister load line and the first canister vent line.

3. The fuel system of claim 1, wherein the first FTIV is further configured to fluidly couple the fuel tank to the first canister load line.

4. The fuel system of claim 1, wherein the third canister is positioned between atmosphere and each of the first canister and the second canister.

5. The fuel system of claim 1, wherein the first canister and the second canister are identical, and wherein the third canister is different than the first canister and the second canister.

6. The fuel system of claim 1, wherein the fuel tank comprises a first fuel limit vent valve (FLVV) and a second FLVV.

7. The fuel system of claim 1, further comprising a controller with instructions stored on memory thereof that when executed enable the controller to flow vacuum from the fuel tank to one or more of the first canister, the second canister, and the third canister.

8. The fuel system of claim 7, wherein the instructions further enable the controller to adjust a depressurization rate of the fuel tank based on a load of the first canister, the second canister, and the third canister.

9. A method, comprising:
   flowing fuel tank vapors to a less loaded of a first canister and a second canister during a depressurization event in response to a fuel tank pressure being less than a threshold pressure; and
   flowing fuel tank vacuum to the more loaded of the first canister and the second canister in response to a load of a third canister being less than a lower threshold load.

10. The method of claim 9, further comprising flowing fuel tank vacuum to only the third canister when the load of the third canister is greater than the lower threshold load.

11. The method of claim 9, further comprising flowing fuel tank vapors to each of the first canister and the second canister when one or more of a load of the first canister is equal to a load of the second canister and the fuel tank pressure is greater than or equal to the threshold pressure.

12. The method of claim 9, further comprising flowing fuel tank vacuum to each of the first canister and the second canister when a load of the first canister is equal to a load of the second canister and the load of the third canister is less than the lower threshold load.

13. The method of claim 9, further comprising adjusting a position of a fuel tank isolation valve (FTIV) to adjust fuel tank vapor and fuel tank vacuum flow to each of the first canister, the second canister, and the third canister.

14. The method of claim 9, further comprising purging the third canister to only one or more of a fuel tank, the first canister, and the second canister.

15. The method of claim 9, wherein an evaporative leak check module is arranged between the third canister and atmosphere, and wherein the third canister is arranged between atmosphere and the first and second canisters.

16. A system, comprising:
   a fuel tank;
   a first canister fluidly coupled to a first port of the fuel tank;
   a second canister fluidly coupled to a second port of the fuel tank;
   a third canister fluidly coupled to one or more of a first canister vent line and a second canister vent line;
   a first fuel tank isolation valve (FTIV) configured to control vapor flow between the fuel tank, the first canister, the second canister, and the third canister; and
   a controller with computer-readable instructions stored on non-transitory memory that when executed cause the controller to:
   adjust the first FTIV to flow fuel tank vacuum to only the third canister when a third canister load is greater than a lower threshold load; and
   adjust the first FTIV to flow fuel tank vacuum to only a more loaded of the first canister and the second canister when the third canister load is less than or equal to the lower threshold load.

17. The system of claim 16, wherein the instructions further cause the controller to adjust the first FTIV and a second FTIV to flow fuel tank vacuum to each of the first canister and the second canister when the third canister load is less than or equal to the lower threshold load and a first canister load is equal to a second canister load.

18. The system of claim 16, wherein the instructions further cause the controller to flow fuel tank vapors to only a less loaded of the first canister and the second canister during a fuel tank depressurization in response to a fuel tank pressure being less than an upper threshold pressure.

19. The system of claim 18, wherein the instructions further cause the controller to flow fuel tank vapors to each of the first canister and the second canister in response to a first canister load being equal to a second canister load during the fuel tank depressurization.

20. The system of claim 16, wherein the instructions further cause the controller to flow fuel tank vapors to each of the first canister and the second canister during a fuel tank depressurization in response to a fuel tank pressure being greater than or equal to an upper threshold pressure.

* * * * *